United States Patent
Kuo

(10) Patent No.: US 9,423,911 B2
(45) Date of Patent: Aug. 23, 2016

(54) CORRECTION METHOD OF TOUCH POINT AND ELECTROMAGNETIC-TYPE TOUCH PANEL USING THE SAME

(71) Applicant: E Ink Holdings Inc., Hsinchu (TW)

(72) Inventor: Wei-Kai Kuo, Taipei (TW)

(73) Assignee: E INK HOLDINGS INC., Hsinchu (TW)

( * ) Notice: Subject to any disclaimer, the term of this patent is extended or adjusted under 35 U.S.C. 154(b) by 57 days.

(21) Appl. No.: 14/620,869

(22) Filed: Feb. 12, 2015

(65) Prior Publication Data
US 2015/0227260 A1   Aug. 13, 2015

(30) Foreign Application Priority Data
Feb. 12, 2014   (TW) .............................. 103104519 A

(51) Int. Cl.
G06F 3/0488 (2013.01)
G06F 3/041 (2006.01)
G06F 3/046 (2006.01)
G06F 3/0354 (2013.01)

(52) U.S. Cl.
CPC .......... G06F 3/0418 (2013.01); G06F 3/03545 (2013.01); G06F 3/046 (2013.01)

(58) Field of Classification Search
CPC ... G06F 3/03545; G06F 3/041; G06F 3/0488; G06F 3/044
See application file for complete search history.

(56) References Cited

U.S. PATENT DOCUMENTS

| | | | |
|---|---|---|---|
| 4,577,057 A | 3/1986 | Blesser | |
| 4,878,553 A | 11/1989 | Yamanami et al. | |
| 4,939,318 A | 7/1990 | Watson et al. | |
| 5,198,623 A | 3/1993 | Landmeier | |
| 5,239,489 A | 8/1993 | Russell | |
| 5,751,229 A | 5/1998 | Funahashi | |
| 6,184,873 B1 | 2/2001 | Ward et al. | |
| 6,778,167 B2 | 8/2004 | Ohashi | |
| 7,145,555 B2 | 12/2006 | Taylor et al. | |
| 7,656,396 B2 | 2/2010 | Bosch et al. | |
| 8,300,030 B2 | 10/2012 | Yeh et al. | |
| 2003/0095115 A1 | 5/2003 | Brian et al. | |

(Continued)

FOREIGN PATENT DOCUMENTS

| | | |
|---|---|---|
| TW | 201120694 A | 6/2011 |
| TW | 201209654 A | 3/2012 |

OTHER PUBLICATIONS

Taiwanese Office Action dated Oct. 13, 2015.

*Primary Examiner* — Ricardo L Osorio
(74) *Attorney, Agent, or Firm* — Rabin & Berdo, P.C.

(57) ABSTRACT

A touch point correction method is provided. Firstly, a first longitudinal base line of several longitudinal electrodes having a maximal energy is detected. Then, a right-side number of the longitudinal electrodes located in right side of the first longitudinal base line and sensing energy is detected. Then, a left-side number of the longitudinal electrodes located in left side of the longitudinal base line and sensing energy is detected. Then, a side corresponding to the largest of the right-side and left-side numbers is used as an inclined side, and a direction from the first longitudinal base line towards the inclined side is defined as an inclined direction. Then, a second longitudinal base line of the longitudinal electrodes having a sub-maximal energy is detected. Then, the sensing point is corrected by correction toward a reverse direction of the inclined direction according to ratio of the sub-maximal energy to the maximal energy.

14 Claims, 8 Drawing Sheets

(56) References Cited

U.S. PATENT DOCUMENTS

| | | | |
|---|---|---|---|
| 2011/0181552 A1* | 7/2011 | Goertz | G06F 3/042 345/175 |
| 2012/0188205 A1* | 7/2012 | Jansson | G06F 3/042 345/175 |
| 2012/0188206 A1* | 7/2012 | Sparf | G06F 3/042 345/175 |
| 2012/0237140 A1 | 9/2012 | Lapstun et al. | |
| 2013/0009907 A1 | 1/2013 | Rosenberg et al. | |
| 2013/0082976 A1 | 4/2013 | Kang | |
| 2013/0232443 A1* | 9/2013 | Ryu | H04M 1/72583 715/784 |

\* cited by examiner

| first inclined angle A11 | first energy ratio R1 | first correction weight |
|---|---|---|
| 10° | 0.842 | 0.75 |
| 20° | 0.864 | 0.8 |
| 30° | 0.886 | 0.85 |
| 40° | 0.889 | 0.9 |

T12

| first inclined angle A11 | first energy ratio R1 | first correction weight |
|---|---|---|
| 10° | 0.834 | 0.75 |
| 20° | 0.851 | 0.8 |
| 30° | 0.866 | 0.85 |
| 40° | 0.851 | 0.9 |

| second inclined angle A12 | second energy ratio R2 | second correction weight |
|---|---|---|
| 10° | 0.826 | 0.75 |
| 20° | 0.767 | 0.8 |
| 30° | 0.740 | 0.85 |
| 40° | 0.690 | 0.9 |

FIG. 6A

| | difference value obtained before correction | difference value obtained after correction |
|---|---|---|
| 10° | 61 | 51 |
| 20° | 91 | 24 |
| 30° | 148 | 13 |
| 40° | 156 | 23 |

CORRECTION METHOD OF TOUCH POINT AND ELECTROMAGNETIC-TYPE TOUCH PANEL USING THE SAME

This application claims the benefit of Taiwan application Serial No. 103104519, filed Feb. 12, 2014, the subject matter of which is incorporated therein by reference.

BACKGROUND OF THE INVENTION

1. Field of the Invention

The invention relates in general to a touch point correction method and a touch device using the same, and more particularly to a touch point correction method and an electromagnetic touch device using the same.

2. Description of the Related Art

Pencil grasps would make a stylus inclined with respect to an electromagnetic inductive touch panel, and the bias between the point sensed by the electromagnetic inductive touch panel and the point actually touched by a user would become too large. Therefore, how to correct the sensing point of the electromagnetic inductive touch panel has become a prominent task for people in the technology field of the invention.

SUMMARY OF THE INVENTION

The invention is directed to a touch point correction method and an electromagnetic touch device using the same capable of resolving the large bias between the point sensed by a touch panel and the point actually touched by a user.

According to one embodiment of the invention, a touch point correction method is provided. The touch point correction method comprises following steps. A sensing point is sensed by an electromagnetic touch panel in response to a touch action, wherein the electromagnetic touch device comprises several longitudinal electrodes. A first longitudinal base line of the longitudinal electrodes having a first maximal energy is detected. A right-side number of the longitudinal electrodes located in right side of the first longitudinal base line and sensing energy is detected. A left-side number of the longitudinal electrodes located in left side of the first longitudinal base line and sensing energy is detected. A side corresponding to the largest of the right-side number and left-side number is used as a first inclined side, and a direction from the first longitudinal base line towards the first inclined side is defined as a first inclined direction. A second longitudinal base line of the longitudinal electrodes located in a first inclined side and having a first sub-maximal energy is detected. The position of the sensing point is corrected by a first correction towards a reverse direction of the first inclined direction according to a ratio of the first sub-maximal energy to the first maximal energy.

According to another embodiment of the invention, an electromagnetic touch device is provided. The electromagnetic touch device comprises a display panel and an electromagnetic touch panel. The electromagnetic touch panel is corresponding to the display panel and comprises several longitudinal electrodes and a processing unit. The longitudinal electrodes are used for sensing a sensing point in response to a touch action. The processing unit is used for: detecting a first longitudinal base line of the longitudinal electrodes having a first maximal energy; detecting a right-side number of the longitudinal electrodes located in right side of the first longitudinal base line and sensing energy; detecting a left-side number of the longitudinal electrodes located in left side of the first longitudinal base line and sensing energy; using a side corresponding to the largest of the right-side number and left-side number as a first inclined side and defining a direction from the first longitudinal base line and towards the first inclined side as a first inclined direction; detecting a second longitudinal base line of the longitudinal electrodes located in first inclined side and having a first sub-maximal energy; and correcting the position of the sensing point by a first correction towards a reverse direction of the first inclined direction according to a ratio of the first sub-maximal energy to the first maximal energy.

The above and other aspects of the invention will become better understood with regard to the following detailed description of the preferred but non-limiting embodiment (s). The following description is made with reference to the accompanying drawings.

BRIEF DESCRIPTION OF THE DRAWINGS

FIG. 5B is a correction table of a stylus inclined leftward with respect to the Z axis;

FIG. 6A is a correction table of a stylus inclined downward with respect to the Z axis;

DETAILED DESCRIPTION OF THE INVENTION

Figure 1:
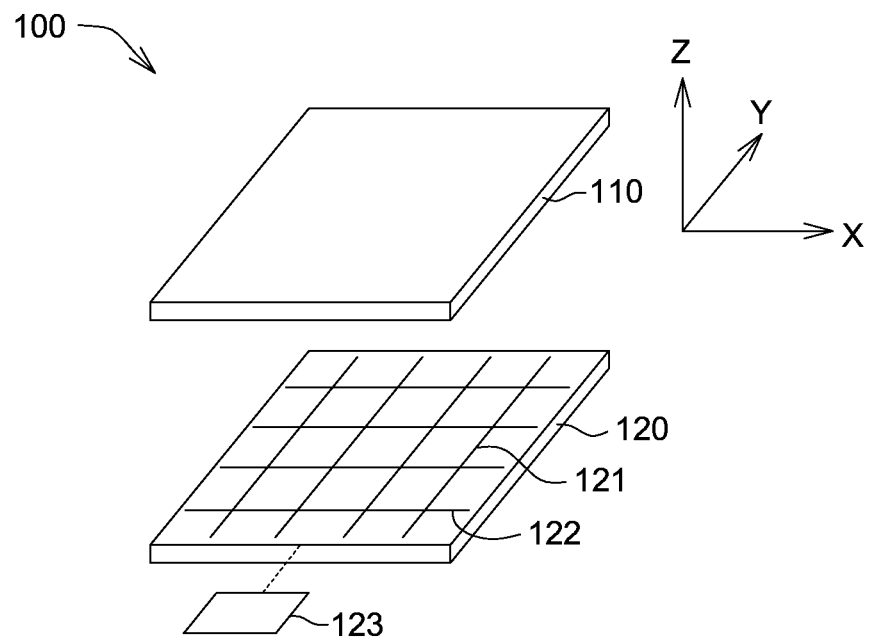
FIG. 1 is an explosion diagram of a touch display device according to an embodiment of the invention.

Referring to FIG. 1, an explosion diagram of a touch display device according to an embodiment of the invention is shown. The touch display device 100 comprises a display panel 110 and an electromagnetic touch panel 120. The display panel 110 can be realized by such as an electrophoretic display, a cholesterol liquid crystal display, a liquid crystal display, a bi-stable display, a multi-stable display, an organic light-emitting diode (OLED) display, a light-emitting diode (LED) display or other types of display panel.

The electromagnetic touch panel 120 comprises several longitudinal longitudinal electrodes 121, several transverse electrodes 122 and a processing unit 123. The longitudinal electrodes 121 extend, for example, along the Y axis, and the transverse electrodes 122 extend, for example, along along the X axis. The processing unit 123 is electrically connected to the longitudinal electrodes 121 and the transverse electrodes 122 for processing signals of the sensing point sensed by the longitudinal electrodes 121 and the transverse electrodes 122.

Figure 2:
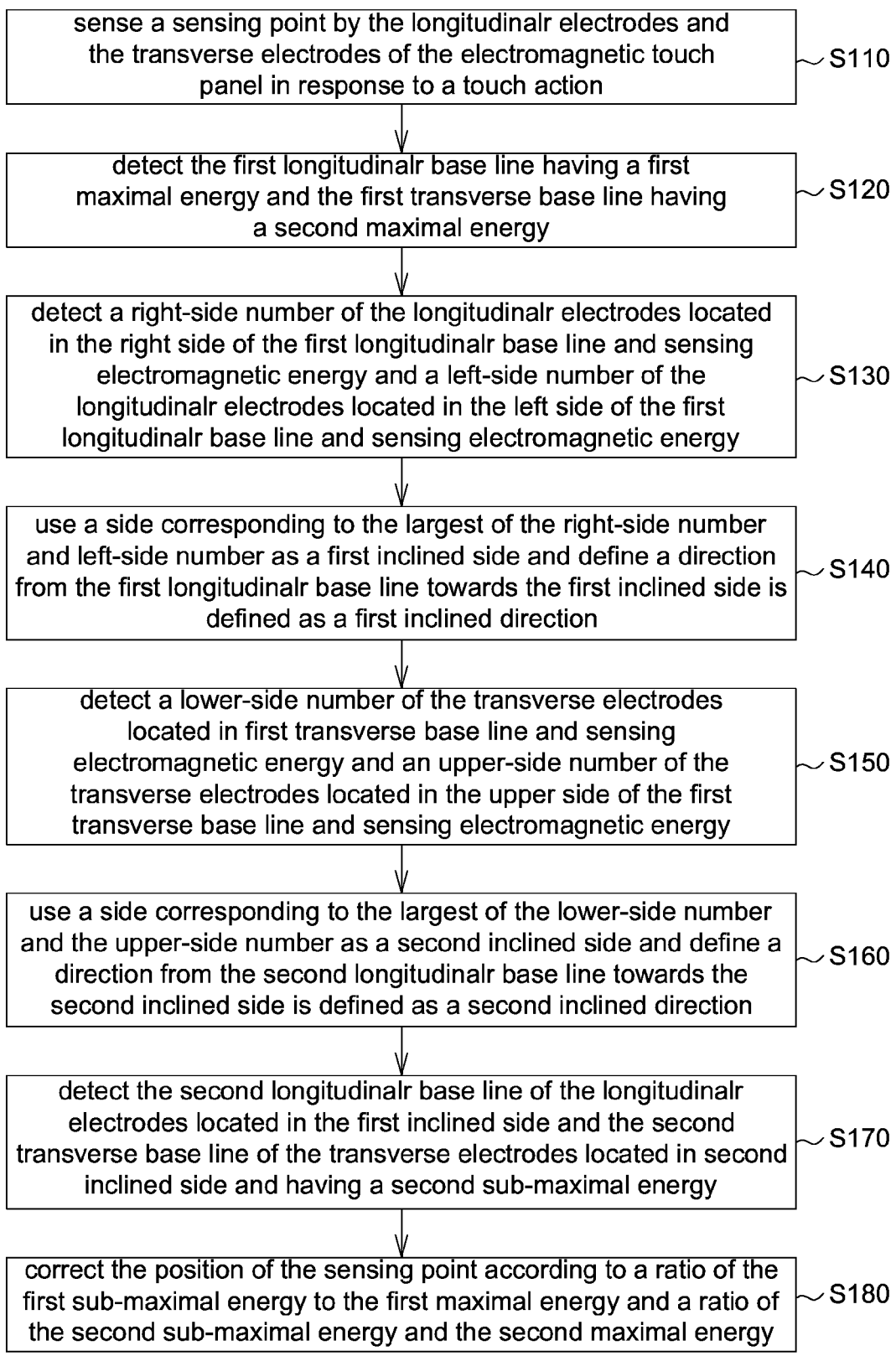
FIG. 2 is a flowchart of a touch point correction method according to an embodiment of the invention.

Referring to FIG. 2, a flowchart of a touch point correction method according to an embodiment of the invention is shown.

Figure 3A:
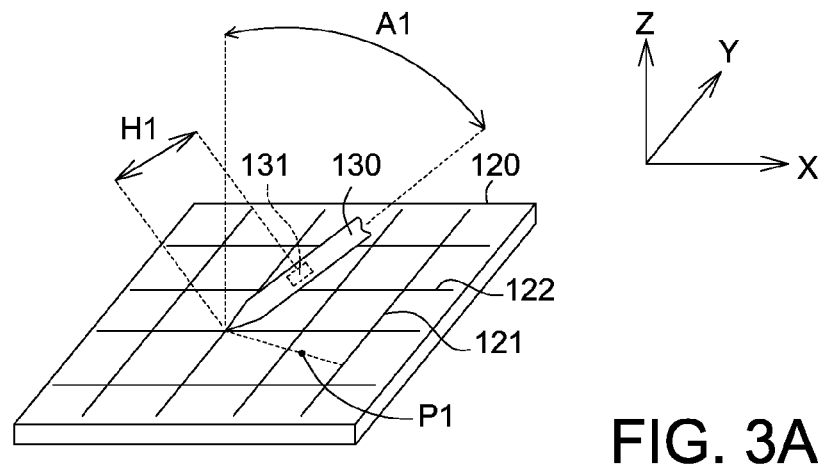
FIGS. 3A~3C are schematic diagrams of a stylus touching the touch display device of FIG. 1.
Figure 3B:
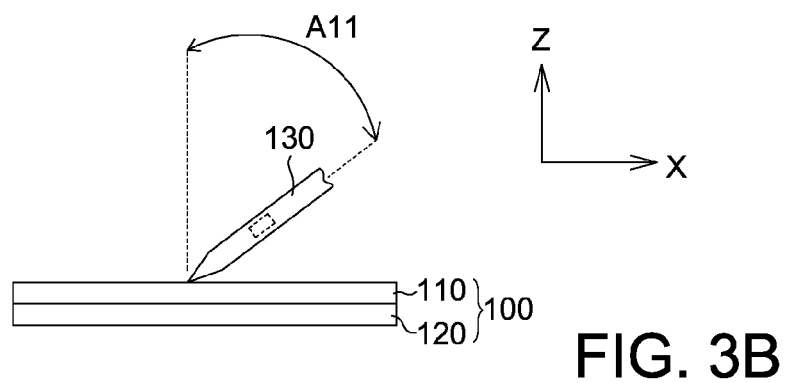
Figure 3C:
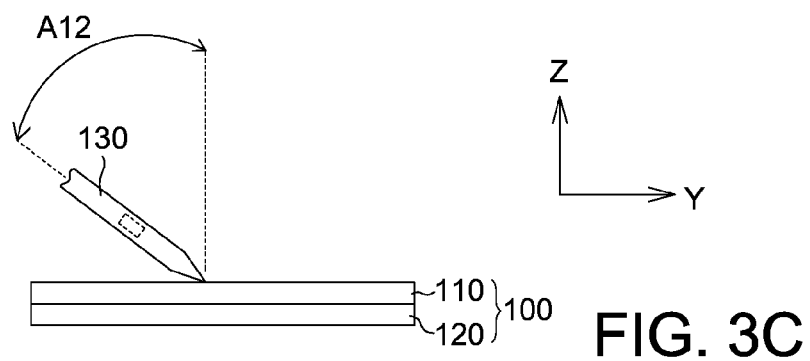

Referring to FIGS. 3A~3C, schematic diagrams of a stylus touching the touch display device of FIG. 1 are shown. In step S110, as indicated in FIG. 3A (the display panel 110 is not illustrated so that the diagram can be more clearly illustrated), a sensing point P1 is sensed by the longitudinal electrodes 121 and the transverse electrodes 122 of the electromagnetic touch panel 120 in response to a touch action. In the present embodiment, the touch action is, for example, a stylus 130 applying a force on the touch display device 100. The stylus 130 can be realized by an active stylus or a passive stylus, and is exemplified by an active stylus in the present embodiment. The stylus 130 comprises a signal transmitter 131, which can be realized by such as a radio frequency identification (RFID) transmitter. The signal transmitter 131 is disposed inside the stylus 130 and is separated from the tip by a distance H1 greater than 1 millimeter. For example, the distance H1 is between 7 to 12 millimeters. The value of the distance H1 is not subjected to specific restrictions in the embodiment of the invention.

When the stylus 130 touches the touch display device 100, the longitudinal electrodes 121 and the transverse electrodes 122 of the electromagnetic touch panel 120 sense a wireless signal transmitted from the signal transmitter 131 and respectively sense different magnitudes of electromagnetic energy. The sensing point P1 is a coordinate point at which the largest electromagnetic energy is sensed. Since the stylus 130 is inclined to an angle A1 with respect to the Z axis of the touch display device 100 and the signal transmitter 131 is separated from the tip of the stylus 130 by a distance H1, the sensing point P1 is not the coordinate point of the tip of the stylus 130. That is, the sensing point P1 is not the touch point actually touched touched by the user. However, by using the correction method of the present embodiment of the invention, the sensing point P1 can be corrected to a position near the tip of the stylus 130, and details of correction are described in in step S120.

In addition, pencil grasps would normally make the stylus 130 inclined with respect to the Z axis. As indicated in FIG. 3B, the projection of the the angle A1 on the XZ plane is a first inclined angle A11, and the stylus 130 of of the present embodiment is inclined rightward with respect to the Z axis (close to the +X axis direction). As indicated in FIG. 3C, the projection of the angle A1 on the YZ plane is a second inclined angle A12, and the stylus 130 of of the present embodiment is inclined downward with respect to the Z axis (close to the –Y axis direction). In another embodiment, the inclination of the stylus 130 is not limited to the exemplifications of FIGS. 3A~3C, the touch point correction method of the present embodiment of the invention can be used as long as the stylus 130 is inclined with respect to the Z axis.

Figures 4, 5A:
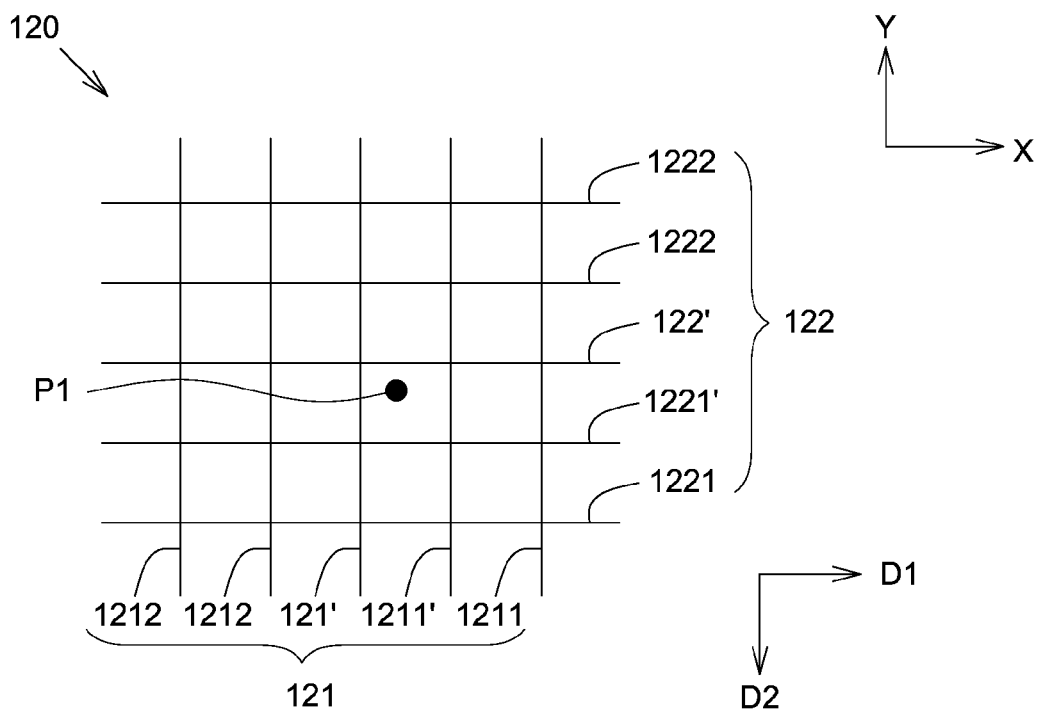
FIG. 4 is a top view of the electromagnetic touch panel of FIG. 1 along the XY plane.
FIG. 5A is a correction table of a stylus inclined rightward with respect to the Z axis.

Referring to FIG. 4, a top view of the electromagnetic touch panel of FIG. 1 along the XY plane is shown. In step S120, a first longitudinal base line 121' having a first maximal energy and a first transverse base line 122' having a second maximal energy are detected by the processing unit 123. Since the first longitudinal base line 121' of the longitudinal electrodes 121 is closest to the sensing point P1, the first longitudinal base line 121' having a first maximal energy is detected by the processing unit 123. The longitudinal electrodes 121 comprises longitudinal electrodes 1211 and 1212, wherein the longitudinal electrode 1211 located in right side of the first longitudinal base line 121' and the longitudinal electrode 1212 located in left side of the first longitudinal base line 121'. Likewise, since the first transverse base line 122' of the transverse electrodes 122 is closest to the sensing point P1, the first transverse base line 122' having a second maximal energy is detected by the processing unit 123. The transverse electrodes 122 comprises transverse electrodes 1221 and 1222, wherein the transverse electrode 1221 is located in lower side of the first transverse base line 122' and the transverse electrode 1222 is located in upper side of the first transverse base line 122'.

In step S130, as indicated in FIG. 4, a right-side number of the longitudinal electrodes 1211 located in the right side of the first longitudinal base line 121' and sensing electromagnetic energy and a left-side number of the longitudinal electrodes 1212 located in the left side of the first longitudinal base line 121' and sensing electromagnetic energy are detected by the processing unit 123. Since the left and the right inclined directions of the stylus stylus 130 are not the same, the number of the longitudinal electrodes 1211 located in the right side of the first longitudinal base line 121' and sensing electromagnetic energy and the number of the longitudinal electrodes 1212 located in the left side of the first longitudinal base line 121' and sensing electromagnetic energy will not be the same. In subsequent step S140, whether the stylus 130 is inclined rightward or leftward is determined according to a comparison between the right-side number of the longitudinal electrodes 1211 located in the right side of the first longitudinal base line 121' and sensing electromagnetic energy and the left-side number of the longitudinal electrodes 1212 located in the left side of the first longitudinal base line 121' and sensing electromagnetic energy that are detected by the processing unit 123 in the present step.

In step S140, as indicated in FIG. 4, a side corresponding to the largest of the right-side number and left-side number is used as a first inclined side by the processing unit 123 and a direction from the first longitudinal base line 121' towards the first inclined side is defined as a first inclined direction. In the present embodiment, since the right-side number is greater than the left-side number, the processing unit 123 determines that the stylus 130 is inclined rightward. Under such circumstance, the first inclined direction D1 is towards the +X axis direction. In another embodiment, if the left-side number is greater than the right-side number, the processing unit 123 determines that the stylus 130 is inclined leftward. Under such circumstance, the first inclined direction D1 is towards the –X axis direction.

In step S150, as indicated in FIG. 4, a lower-side number of the transverse electrodes 1221 located in first transverse base line 122' and sensing electromagnetic energy and an upper-side number of the transverse electrodes 1222 located in the upper side of the first transverse base line 122' and sensing electromagnetic energy are detected by the processing unit 123. Since the upward and the downward inclined directions of the stylus 130 are not the same, the number of the transverse electrodes 1221 located in the lower side of the first transverse base line 122' and sensing electromagnetic energy and the number of the transverse electrodes 1222 located in the upper side of the first transverse base line 122' and sensing electromagnetic energy will not be the same. In subsequent step S160, whether the stylus 130 is inclined upward or downward is determined according to a comparison between the lower-side number of the transverse electrodes 1221 located in first transverse base line 122' and sensing electromagnetic energy and the upper-side number of the transverse electrodes 1222 located in the upper side of the first transverse base line 122' and sensing electromagnetic energy that are detected by the processing unit 123 in the present step.

In step S160, as indicated in FIG. 4, a side corresponding to the largest of the lower-side number and the upper-side number is used as a second inclined side by the processing unit 123, and a direction from a second second longitudinal base line 122' towards the second inclined side is defined as a second inclined direction. In the present embodiment, since the lower-side number is greater than the upper-side number, the processing unit 123 determines that the stylus 130 is inclined downwards. Under such circumstance, the second inclined direction D2 is towards the −Y axis direction. In another embodiment, if the upper-side number is greater the lower-side number, the processing unit 123 determines that the stylus 130 is inclined upwards. Under such circumstance, the second inclined direction D2 is towards +Y axis direction.

In step S170, the second longitudinal base line 1211' of the longitudinal electrodes 1211 located in the first inclined side and the second transverse base line 1221' of the transverse electrodes 1221 located in second second inclined side and having a second sub-maximal energy are detected by the processing unit 123. The closer to the first longitudinal base line 121', the more the energy will be sensed by the longitudinal electrodes 1211; conversely, the farther away from the first longitudinal base line 121', the lesser the energy will be sensed by the longitudinal electrodes 1211. Since the the second longitudinal base line 1211' of the longitudinal electrodes 1211 located in the first inclined side (the right side of the first longitudinal base line 121') is closest to the first longitudinal base line 121', the second longitudinal base line 1211' having a first sub-maximal energy is detected by the processing unit 123. The first sub-maximal energy is less than the said first maximal energy. Likewise, the second transverse base line 1221' of the transverse electrodes 1221 located in second inclined side (the lower side of the first transverse base line 122') and having a second sub-maximal energy is is detected by the processing unit 123. The second sub-maximal energy is less than the said second maximal energy.

Figure 6B:
FIG. 6B is a correction table of a stylus inclined upward with respect to the Z axis.
Figure 7:
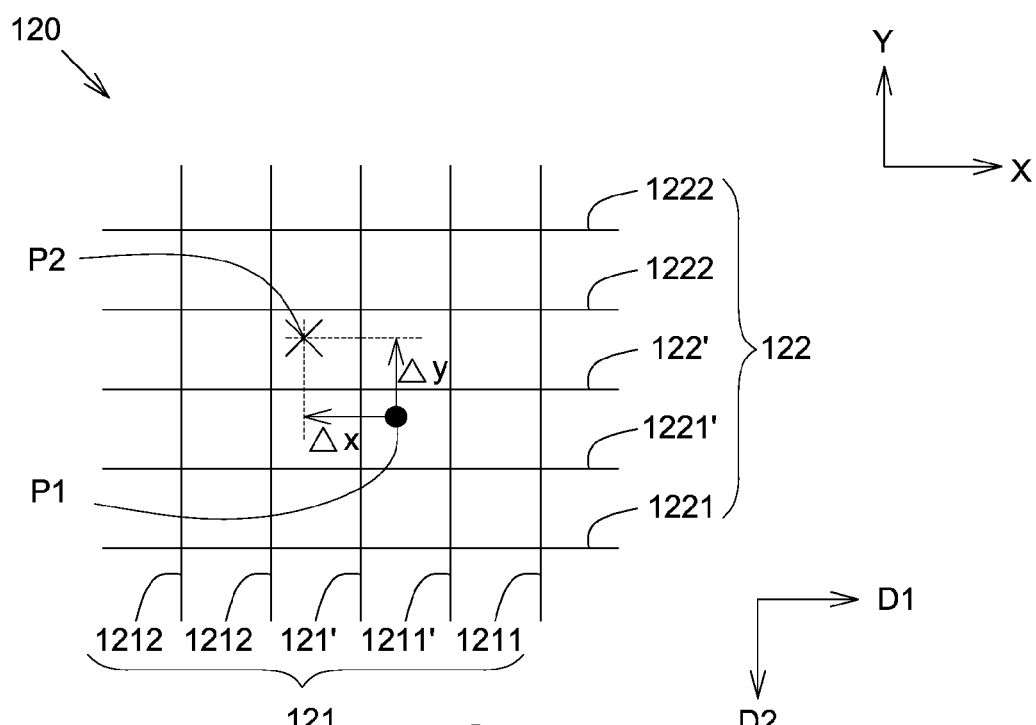
FIG. 7 is a schematic diagram of the position of the sensing point of FIG. 4 being corrected to a touch point.

Refer to FIGS. 5A~7. FIG. 5A is a correction table of a stylus inclined rightward with respect to the Z axis. FIG. 5B is a correction table of a stylus inclined leftward with respect to the Z axis. FIG. 6A is a correction table of a stylus inclined downward with respect to the Z axis. FIG. 6B is a correction table of a stylus inclined upward with respect to the Z axis. FIG. 7 is a schematic diagram of the position of the sensing point of FIG. 4 being corrected to a touch point. In step S180, the position of the sensing point is corrected according to a ratio of the first sub-maximal energy to the first maximal energy and a ratio of the second sub-maximal energy and the second maximal energy. The correction table T11 of FIG. 5A, the correction table T12 of FIG. 5B, the correction table T21 of FIG. 6A and the correction table T22 of FIG. 6B are obtained under the circumstance that the signal transmitter 131 is separated from the tip of the stylus 130 by about 5~7 millimeters.

As indicated in FIG. 7, since the stylus 130 of the present embodiment is inclined rightward with respect to the Z axis, the processing unit 123 corrects the sensing point P1 by a first correction $\Delta x$ along a reverse direction the first inclined direction D1 (for example, towards −X axis direction) according to the correspondence relationship between the first energy ratio R1 and the first correction weight illustrated in the correction table table T11 of FIG. 5A. For example, when the first energy ratio R1 is 0.842 (FIG. 5A) and the corresponding first correction weight is 0.75, the first correction $\Delta x$ is a product of the correction base value and 0.75, wherein the correction base value is, for example, 400 pixels or other suitable pixel amount. Also, when the first energy ratio R1 is 0.864 (FIG. 5A) and the corresponding first correction weight is 0.8, the first correction $\Delta x$ is a product of the same correction base value and 0.8. In addition, the first correction weight of each inclined angle is less than 1 and ranges between 0.7 to 0.9 or a value within a specific range. The correction base value is not limited to a pixel amount, and can also be a length unit such as millimeter. In another embodiment, when the the stylus 130 is inclined leftward with respect to the Z axis and the first inclined direction D1 is the −X axis direction, the processing unit 123 can correct the position of the sensing point P1 along a reverse direction the first inclined direction D1 (that is, towards the +X axis direction) with reference to the correction table T12 of FIG. 5B.

Likewise, as indicated in FIG. 7, since the stylus 130 of the present embodiment is downward with respect to the Z axis, the processing unit 123 corrects the sensing point P1 by a second correction $\Delta y$ along a reverse direction the second inclined direction D2 (for example, towards +Y axis direction) according to the correspondence relationship between the second energy ratio R2 and the second correction weight illustrated in the correction table T21 of FIG. 6A. For example, when the second energy ratio R2 is 0.826 (FIG. 6A) and the corresponding second correction weight is 0.75, the second correction $\Delta y$ is a product of the correction base value and 0.75, wherein the the correction base value is, for example, 400 pixels or other suitable pixel amount. Also, when the second energy ratio R2 is 0.767 (FIG. 6A) and the corresponding first correction weight is 0.8, the second correction $\Delta y$ is a product of the same correction base value and 0.8. In addition, the first correction weight of each inclined angle is less than 1 and ranges between 0.7~0.9 or a value within a specific range. In another embodiment, when the stylus 130 is inclined upward with respect to the Z axis, the processing unit 123 can correct the position of the sensing point P1 along a reverse direction the second inclined direction D2 (that is, towards the −Y axis direction) with reference to the correction table T22 of FIG. 6B.

As indicated in FIG. 7, the coordinates of the touch point P2 are obtained after the sensing point P1 was corrected by the first correction $\Delta x$ towards a reverse direction of the first inclined direction D1 (for example, towards the −X axis direction) and the second correction $\Delta y$ along a reverse direction the second inclined direction D2 (for example, towards the +Y axis direction). The touch point P2 is close to or even overlaps the coordinate point of the tip of the stylus 130.

Figures 8, 9A:
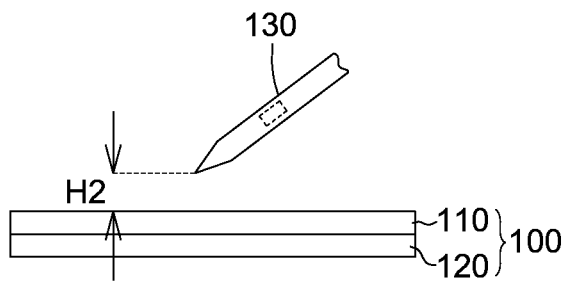
FIG. 8 is a table of test results using the touch point correction method according an embodiment of the invention.
FIG. 9A is a schematic diagram of a stylus touching a touch display device according to another embodiment of the invention.

Referring to FIG. 8, a table of test results using the touch point correction method according an embodiment of the invention is shown. The "difference value" in the table represents the difference in the pixel amount between the touch point of an inclined stylus and the touch point of a stylus parallel to the Z axis (the inclined angle is 0°). Suppose the touch point is corrected by a correction towards a reverse direction of the first inclined direction D1 (for example, towards the −X axis direction). In the contrast group not using the touch point correction method of the embodiment of the invention, invention, the difference value between the touch point of an inclined stylus and the touch point of a stylus parallel to the Z axis is divergent (for example, when the stylus is inclined rightward by 10°, the difference value is 61 pixels; when the stylus is inclined rightward by 20°, the difference diverges to 91 pixels). In comparison to the contrast group, the difference value between the touch point P2 of the stylus of the present embodiment of the invention and the touch point P2 of a stylus parallel to the Z axis is convergent (for example, when the stylus is inclined rightward by 10°, the difference value is 51 pixels; when the stylus is inclined rightward by 20°, the difference diverges to 24 pixels) and the difference value is smaller. Therefore, the touch point correction method of the present embodiment of the invention is capable of correcting the sensing point to be closer to or even overlapping the tip point of the stylus. Also, similar effect of correction can be achieved if the sensing point point is corrected towards a reverse direction of the second inclined direction D2, and the similarities are not repeated here.

Figure 9B:
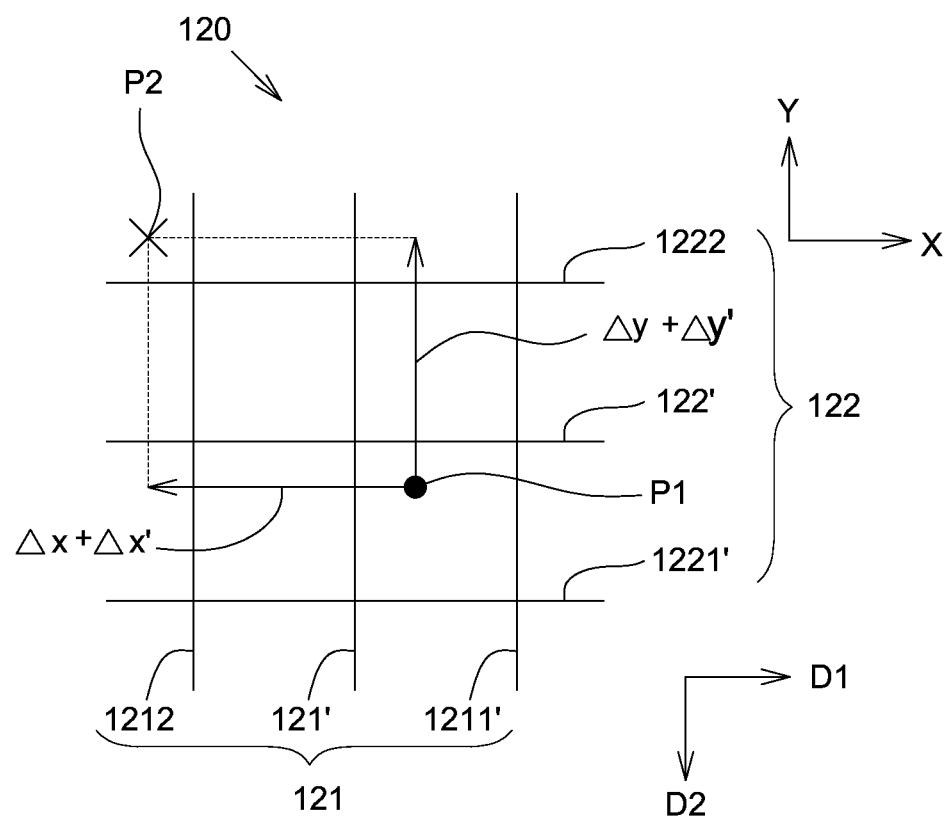
FIG. 9B is a schematic diagram of the position of the sensing point of FIG. 9A being corrected to a touch point.

FIG. 9A is a schematic diagram of a stylus touching a touch display device according to another embodiment of the invention. FIG. 9B is a schematic diagram of the position of the sensing point of FIG. 9A being corrected to a touch point. In the present embodiment, under the circumstance circumstance that the tip of the stylus 130 is separated from the touch display device 100 by a distance H2, the electromagnetic touch panel 120 generates the sensing point P1. Under such circumstance, the sensing point P1 is corrected by a first correction Δx+Δx' along a reverse direction of the first inclined direction D1 and corrected by a second correction Δy+Δy' along a reverse direction of the second inclined direction D2, wherein Δx' and Δy' represent the compensations for the tip of the stylus 130 from a hanging state to touching the touch display device 100. Moreover, the value of the distance H2 is not subjected to specific restrictions in the embodiment of the invention, and any distance would do as long as such distance keeps the tip is in a hanging state.

While the invention has been described by way of example and in terms of the preferred embodiment (s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A touch point correction method, comprising:
    sensing a sensing point by an electromagnetic touch panel in response to a touch action, wherein the electromagnetic touch device comprises a plurality of longitudinal electrodes;
    detecting a first longitudinal base line of the longitudinal electrodes having a first maximal energy;
    detecting a right-side number of the longitudinal electrodes located in a right side of the first longitudinal base line and sensing energy;
    detecting a left-side number of the longitudinal electrodes located in a left side of the first longitudinal base line and sensing energy;
    using a side corresponding to the largest of the right-side number and the left-side number as a first inclined side, and defining a direction from the first longitudinal base line towards the first inclined side as a first inclined direction;
    detecting a second longitudinal base line of the longitudinal electrodes located in first inclined side and having a first sub-maximal energy; and
    correcting a position of the sensing point by a first correction towards a reverse direction of the first inclined direction according to a ratio of the first sub-maximal energy to the first maximal energy.

2. The touch point correction method according to claim 1, wherein the touch action is a touch type touch action.

3. The touch point correction method according to claim 1, wherein the touch action is a non-touch type touch action.

4. The touch point correction method according to claim 1, wherein the touch action is generated by a stylus.

5. The touch point correction method according to claim 4, wherein the first correction is a product of a correction base value and a correction weight, and the correction weight is proportional to an inclined angle of the stylus.

6. The touch point correction method according to claim 5, wherein the correction base value is a pixel amount.

7. The touch point correction method according to claim 1, wherein the electromagnetic touch device comprises a plurality of transverse electrodes, and the touch point correction method further comprises:
    detecting a first transverse base line of the transverse electrodes having a second maximal energy;
    detecting an upper-side number of the transverse electrodes located in an upper side of the first transverse base line and sensing energy;
    detecting a lower-side number of the transverse electrodes located in a lower side of the first transverse base line and sensing energy;
    using a side corresponding to the largest of the upper-side number and the lower-side number as a second inclined side, and defining a direction from the first transverse base line towards the second inclined side as a second inclined direction;
    detecting a second transverse base line of the transverse electrodes located in second inclined side as a second sub-maximal energy; and
    correcting the sensing point by a second correction towards a reverse direction of the second inclined direction according to a ratio of the second sub-maximal energy to the second maximal energy.

8. An electromagnetic touch panel, comprising:
    a plurality of longitudinal electrodes used for sensing a sensing point in response to a touch action; and
    a processing unit used for:
        detecting a first longitudinal base line of the longitudinal electrodes having a first maximal energy;
        detecting a right-side number of the longitudinal electrodes located in a right side of the first longitudinal base line and sensing energy;
        detecting a left-side number of the longitudinal electrodes located in a left side of the first longitudinal base line and sensing energy;
        using a side corresponding to the largest of the right-side number and left-side number as a first inclined side, and defining a direction from the first longitudinal base line and towards the first inclined side as a first inclined direction;
        detecting a second longitudinal base line of the longitudinal electrodes located in first inclined side and having a first sub-maximal energy; and
        correcting the position of the sensing point by a first correction towards a reverse direction of the first inclined direction according to a ratio of the first sub-maximal energy to the first maximal energy.

9. The electromagnetic touch panel according to claim 8, wherein the touch action is a touch type touch action.

10. The electromagnetic touch panel according to claim 8 The electromagnetic touch panel, wherein the touch action is a non-touch type touch action.

11. The electromagnetic touch panel according to claim 8, wherein the touch action is generated by a stylus.

12. The electromagnetic touch panel according to claim 11, further comprising:
    calculating a product of a correction base value and a correction weight and using the product value as the first correction, wherein the correction weight is proportional to inclined angle of the stylus.

13. The electromagnetic touch panel according to claim 12, wherein the correction base value is a pixel amount.

14. The electromagnetic touch panel according to claim 8, wherein the electromagnetic touch panel further comprises a plurality of transverse electrodes, and the processing unit is used for:
- detecting a first transverse base line of the transverse electrodes having a second maximal energy;
- detecting an upper-side number of the transverse electrodes located in an upper side of the first transverse base line and sensing energy;
- detecting a lower-side number of the transverse electrodes located in a lower side of the first transverse base line and sensing energy;
- using a side corresponding to the largest of the upper-side number and the lower-side number as a second inclined side, and defining a reverse direction of the first transverse base line towards the second inclined side as a second inclined direction;
- detecting a second transverse base line of the transverse electrodes located in second inclined side and having a second sub-maximal energy; and
- correcting the sensing point by a second correction towards a reverse direction of the second inclined direction according to a ratio of the second sub-maximal energy to the second maximal energy.

* * * * *